United States Patent [19]
Cho et al.

[11] Patent Number: 5,602,594
[45] Date of Patent: Feb. 11, 1997

[54] BUFFER CONTROL APPARATUS FOR COMPRESSION OF VIDEO INTRAFRAMES

[75] Inventors: Sung K. Cho; Yong H. Lee, both of Daejon; Joon P. Chang; Choon Lee, both of Seoul, all of Rep. of Korea

[73] Assignee: Goldstar Co., Ltd., Seoul, Rep. of Korea

[21] Appl. No.: 289,566

[22] Filed: Aug. 12, 1994

[30]        Foreign Application Priority Data

Aug. 14, 1993  [KR]  Rep. of Korea ............... 15772/1993

[51] Int. Cl.[6] ................................................. H04N 7/30
[52] U.S. Cl. ........................................... 348/419; 348/700
[58] Field of Search ................................. 348/384, 390, 348/395, 400–405, 407–409, 419, 420, 699, 700; 358/433; H04N 7/130, 7/133

[56]            References Cited

U.S. PATENT DOCUMENTS

| | | | |
|---|---|---|---|
| 4,797,742 | 1/1989 | Sugiyama et al. | 348/407 |
| 4,920,426 | 4/1990 | Hatori et al. | 348/405 |
| 5,046,071 | 9/1991 | Tanoi | 348/402 |
| 5,073,821 | 12/1991 | Juri | 348/405 |
| 5,253,075 | 10/1993 | Sugiyama | 358/433 |
| 5,299,019 | 3/1994 | Pack et al. | 348/405 |
| 5,309,231 | 5/1994 | Hamada et al. | 348/404 |
| 5,317,397 | 5/1994 | Odaka et al. | 348/699 |
| 5,321,440 | 6/1994 | Yanagihara et al. | 348/408 |
| 5,333,012 | 7/1994 | Singhal et al. | 348/405 |
| 5,369,439 | 11/1994 | Matsuda et al. | 348/395 |

*Primary Examiner*—Thai Q. Tran
*Assistant Examiner*—Richard Lee

[57]            ABSTRACT

An apparatus for controlling a buffer adapted to transmit motion-involving video compressed by use of an intraframe compression coding technique employing discrete cosine transform and variable length coding to a constant rate channel, wherein a statistical feed-forward-based buffer control apparatus having a simple construction is combined with an existing statistical feed-back-based buffer control apparatus, thereby being capable of stably controlling a buffer even when a scene change occurs, and reducing the capacity of the buffer and the length of a tape needed. The apparatus includes an encoder for encoding input video data to be compressed, and a feed-forward-based division factor selector for receiving an output signal from the encoder, calculating the complexity of each frame based on the received signal, estimating the quantity of data to be generated by units of a predetermined number of discrete cosine transform blocks, and sending a division factor corresponding to the estimated quantity of data to the encoder.

13 Claims, 4 Drawing Sheets

BUFFER CONTROL APPARATUS FOR COMPRESSION OF VIDEO INTRAFRAMES

BACKGROUND OF THE INVENTION

Field of the Invention

The present invention relates to a buffer control apparatus for the compression of video intraframes, and more particularly to a buffer control apparatus for the compression of motion-involving video intraframes, capable of stably controlling a buffer even when a scene change occurs and simply realizing the buffer control, by the use of a combination of a feed-forward-based buffer control and a feed-back-based buffer control.

As a buffer control method used for the compression of motion-involving video intraframes, there have been generally known a feed-back-based buffer control method and a feed-forward-based buffer control method.

Referring to FIG. 1, there is illustrated a known feed-back-based buffer control apparatus. As shown in FIG. 1, the buffer control apparatus includes a frame memory 10 for storing input video frame data therein, an encoder 20 for encoding data output from the frame memory 10, a buffer 30 for transmitting encoded data output from the encoder 20 to a downstream constant rate channel(not shown), and a quantization parameter selector 40 for sending a division factor (DF) value (i.e., step size) corresponding to the quantity of data outputted from the buffer 30 to the encoder 20 and thereby controlling the quantity of data output from the buffer 30.

The encoder 20 includes a discrete cosine transform (DCT) circuit 21 adapted to carry out a DCT operation upon the video data outputted from the frame memory 10 in units of 8×8 blocks, a quantizer 22 adapted to quantize data output from the DCT circuit 21, and a variable length coding (VLC) circuit 23 adapted to variable length encode the quantized data outputted from the quantizer 22.

The operation of the feed-back-based buffer control apparatus having the above-mentioned construction will now be described.

Upon receiving video frame data from the frame memory 10, the DCT circuit 21 carries out a DCT operation upon the video frame data and sends the resultant DCT video data to the quantizer 22. The DCT video data received from the DCT circuit 21 is then quantized in the quantizer 22 under a control of the quantization parameter selector 40. The resultant quantized data is then sent to the VLC circuit 23 which, in turn, encodes the received data and sends the resultant encoded quantized (i.e., compressed) data to the buffer 30. Thereafter, the buffer 30 sends the received encoded quantized data to the downstream constant rate channel. During the quantizing operation of the quantizer 22, the quantization parameter selector 40 controls the quantizer 22 in order to control the quantity of data outputted from the buffer 30 to the downstream constant rate channel.

The quantity of data generated from the encoder 20 is determined depending on the step size set in the quantizer 22. In other words, when the quantization parameter selector 40 increases the value of the DF on the basis of the condition of the buffer 30 and sends the DF to the quantizer 22, the step size in the quantizer 22 is decreased correspondingly to the increased DF value. As a result, the quantity of data encoded in the encoder 20 is increased.

On the contrary, when the quantization parameter selector 40 decreases the value of the DF on the basis of a condition of the buffer 30 and sends the DF to the quantizer 22, the step size in the quantizer 22 is increased correspondingly to the decreased DF value, so that the quantity of data quantized in the quantizer 22 may be decreased. As a result, the quantity of data encoded in the encoder 20 is decreased.

On the other hand, there have been known the heuristic buffer control method and the statistical buffer control method employed as a feed-back-based buffer control method.

In accordance with the heuristic buffer control method, the DF values are controlled, depending on the fullness of the buffer based upon a buffer fullness (BF)-DF curve as shown in FIG. 2. In FIG. 2, the state of BF=0 represents the state where no data is contained in the buffer whereas the state of BF=1 represents the state where data is fully contained in the buffer.

If an inequality occurs between the quantity of data generated from the encoder 20 and the quantity of data outputted from the buffer 30, the quantity of data in the buffer 30 may be varied. When the quantity of data in the buffer is increased, corresponding to an increase in BF, a smaller DF is selected for a frame to be subsequently encoded, as apparent from the BF-DF curve of FIG. 2. As a result, the quantity of data generated is reduced. On the contrary, when the quantity of data in the buffer is decreased corresponding to a decrease in BF, a larger DF is selected for a frame to be subsequently encoded. As a result, the quantity of data generated is increased. Accordingly, the bit rate of data generated in the encoder 20 corresponds to the bit rate of data outputted from the buffer 30.

In the case of an initial state where an encoding operation begins or a state that a scene change occurs, a proper DF value can not be selected, so that an inequality may occur between the number of bits generated from the encoder 20 and the number of bits outputted from the buffer 30. In this case, both the BF value and the DF value of the buffer 30 are continuously varied until the buffer 30 reaches a stable state. When the buffer 30 reaches the stable state, the variation in BF and DF values is hardly generated, thereby causing the BF and DF values to be subsequently constant.

On the other hand, in accordance with the statistical buffer control method, the quantity of data to be generated from video data to be currently encoded is statistically estimated using the quantity of data obtained from video data encoded just prior to the encoding of the current video data and a DF value for the previous video data. Thereafter, a DF value corresponding to an estimated value most approximate to the quantity of data currently outputted from the buffer 30 is selected using a DF-bit curve as shown in FIG. 3.

Values in the DF-bit curve shown in FIG. 3 represent mean values of data quantities and deviation values respectively generated when six different test pictures, namely, a table tennis picture, a flower garden picture, a surge picture, a popple picture, a mobile and calendar picture, and a tempest picture are applied to a JPEG base line data compression algorithm while varying DF from 0 to 12 at a rate of 0.1.

Statistically, two successive video units in a video sequence have similar characteristics. Accordingly, they generate approximate numbers of bits for the same DF value. Using the number of bits $n_k(m)$ obtained from a video unit currently encoded and a corresponding DF value m, the number of bits $n_{k+1}(P)$ from a next video unit to be subsequently encoded can be expressed by the following equation (1):

$$n_{k+1}(P) = d(P) \times \frac{n_k(m) - a(m)}{d(m)} + a(P) \quad (1)$$

Using the above equation (1), the number of bits is estimated for every DF value P, namely, each DF value ranging from 0 to 12. Thereafter, a DF value is selected which corresponds to the estimated bit number most approximate to the bit rate outputted from the buffer 30. In equation (1), "a(P)" stands for the amount of data in the case of DF=P whereas "d(P)" stands for a deviation in the same case.

In accordance with the above-mentioned buffer control method, the buffer 30 is controlled variably, depending on its state. The states of buffer 30 include a scene change state, an over-flow state and a normal state. In the normal state of buffer 30, the above-mentioned procedure is used. In the scene change state, the number of bits generated is adjusted to approximate the number of bits outputted from the buffer while varying the DF value several times. The buffer control is carried out only one time per frame in the normal state. Where the buffer 30 is filled with data to 95% of its capacity, it is at the over-flow state. In this case, a quantization involving the largest step size is used.

FIG. 4 is a block diagram illustrating a conventional feed-forward-based buffer control apparatus wherein the general feed-forward-based buffer control is applied to a JPEG data compression algorithm. In this case, video data outputted from a DCT circuit 50 is sent to a plurality of quantizers which, in turn, each compress the same received video data. The quantizers have different DF values. In FIG. 4, only the first one, the second one and the N-th one of the quantizers are shown and denoted by the reference numerals 61, 62 and 63, respectively. Among the quantizers, the one is selected which generates data most approximate in quantity to data outputted from a buffer 80. The output data from the selected quantizer is then sent to the buffer 80 via a corresponding one of the VLC circuits. In similar fashion to the quantizers, only the first one, the second one and the N-th one of the VLC circuits are shown and denoted by the reference numerals 71, 72 and 73, respectively.

In accordance with these conventional buffer control methods, however, insufficiently compressed video data has a possibility of causing an over-flow in buffer 80 because an operation initiating point of the buffer 80 is determined at a state where the fullness of the buffer is excessively high. On the contrary, excessively compressed video data has a possibility of causing an under-flow in buffer 80. Furthermore, the period of transition until the buffer reaches a stable state is lengthened when a scene change occurs. In this case, the buffer selects an erroneous DF value, thereby causing the number of bits generated in the encoder to be greatly increased. In order to absorb such a variation, the buffer should have a sufficient capacity. Where the buffer has an insufficient capacity, the variation in BF and DF values becomes severe, resulting in poor picture quality.

In the case of the feed-back-based statistical buffer control method, a scene change results in an erroneous estimation for the bit rate. Since a new DF is determined, based on the erroneously estimated bit rate, the number of output bits is greatly increased. For this buffer control method, accordingly, the buffer should also have a large capacity. Such a large buffer capacity results in a lengthened delay time in the buffer. In an application of a digital video cassette recorder, the number of tracks required per frame is determined for the maximum quantity of data generated. In this regard, a high variation in the quantity of encoded data results in the wastage of tape. Moreover, since the buffer should be controlled several times for every frame when a scene change occurs, its control becomes complex. Consequently, effective buffer control may not be practically realized.

On the other hand, the feed-forward-based buffer control method does not incur the problem encountered in the feed-back-based method in association with a scene change, because the quantity of input data received in the buffer is previously adjusted to approximate the quantity of output data. However, the feed-forward-based buffer control method requires a very large amount of computation. As a result, this method may not easily be realized practically. This method also has a problem of demanding a considerably larger amount of computation, as compared to the feed-back-based buffer control method.

SUMMARY OF THE INVENTION

Therefore, an object of the invention is to provide a buffer control apparatus for the compression of video intraframes, capable of stably controlling a buffer even when a scene change occurs and simply realizing the buffer control, by the use of a combination of the feed-forward-based buffer control and the feed-back-based buffer control.

In accordance with one aspect, the present invention provides a buffer control apparatus for the compression of motion-involving video intraframes which comprises: an encoder means for encoding input video data to be compressed; and a feed-forward-based division factor selector means for receiving an output signal from the encoder means, calculating the complexity of each frame based on the received signal, estimating the quantity of data to be generated in the unit of predetermined number of discrete cosine transform blocks, and sending a division factor corresponding to the estimated quantity of data to the encoder means.

In accordance with another aspect, the present invention provides a buffer control apparatus for video compression of motion-involving intraframes which comprises: an encoder-means for encoding input video frame data including luminance and chrominance signals to be compressed; a buffer means for receiving encoded data output from the encoder means and externally outputting it; a feed-back-based division factor selector means for generating a division factor corresponding to a state of the buffer means and sending the division factor to a mode selector means; a feed-forward-based division factor selector means for receiving output information from the encoder means, calculating the complexity of each video frame input based on the received information, and estimating the quantity of data of luminance and chrominance signals thereof on the basis of the calculation; a scene change detector means for receiving estimated values of bit rates of two successive frames from the feed-forward-based division factor selector means, detecting a scene change when a bit rate difference between two successive frames exceeds a predetermined threshold value, and generating a scene change detect signal on the basis of the detection; and a mode selector means for transmitting a division factor from the feed-forward-based division factor selector means to the encoder means upon receiving the scene change detect signal from the scene change detector means and for transmitting the division factor from the feed-back-based division factor selector means to the encoder means in the absence of the scene change detect signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Other objects and aspects of the invention will become apparent from the following description of embodiments with reference to the accompanying drawings which are given by way of illustration only, and thus are not limitative of the present invention, in which.

DETAILED DESCRIPTION OF THE PREFERRED EMBODIMENTS

Figure 5:
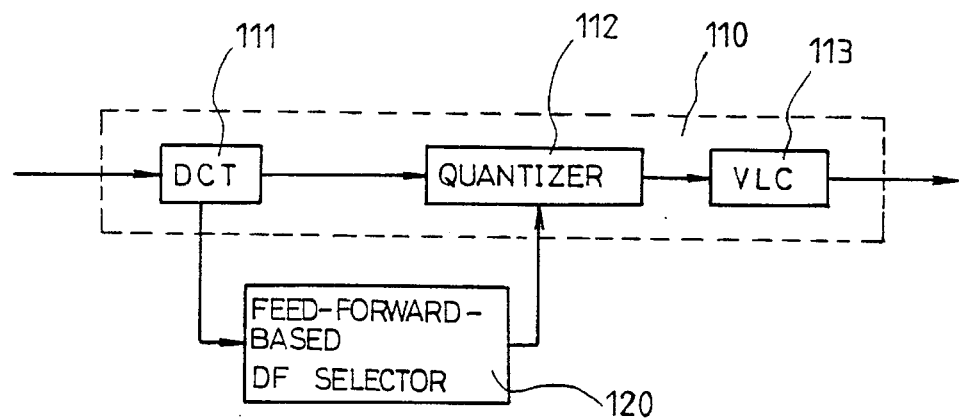
FIG. 5 is a block diagram of a feed-forward-based buffer control apparatus in accordance with an embodiment of the present invention wherein a feed-forward-based buffer control in accordance with the present invention is applied to a JPEG data compression algorithm implementation.

Referring to FIG. 5, there is illustrated a feed-forward-based buffer control apparatus for compression of motion-involving video intraframes in accordance with an embodiment of the present invention. As shown in FIG. 5, the feed-forward-based buffer control apparatus includes a DCT circuit 111 for converting spatial information of input video data into frequency information, a quantizer 112 for quantizing an output signal from the DCT circuit 111 to approximate a finite number of values, a VLC circuit 113 for converting position information and magnitude information of the quantized data signal from the quantizer 112 into a variable length code without any loss of data, and a feed-forward-based DF selector 120 for receiving an output signal from the DCT circuit 111, calculating the complexity of each frame based on the received signal, estimating the quantity of data of the frame in units of a predetermined number of DCT blocks, and sending a DF value corresponding to the estimated quantity of data to the quantizer 112.

In FIG. 5, reference numeral 110 designates an encoder.

Figure 7:
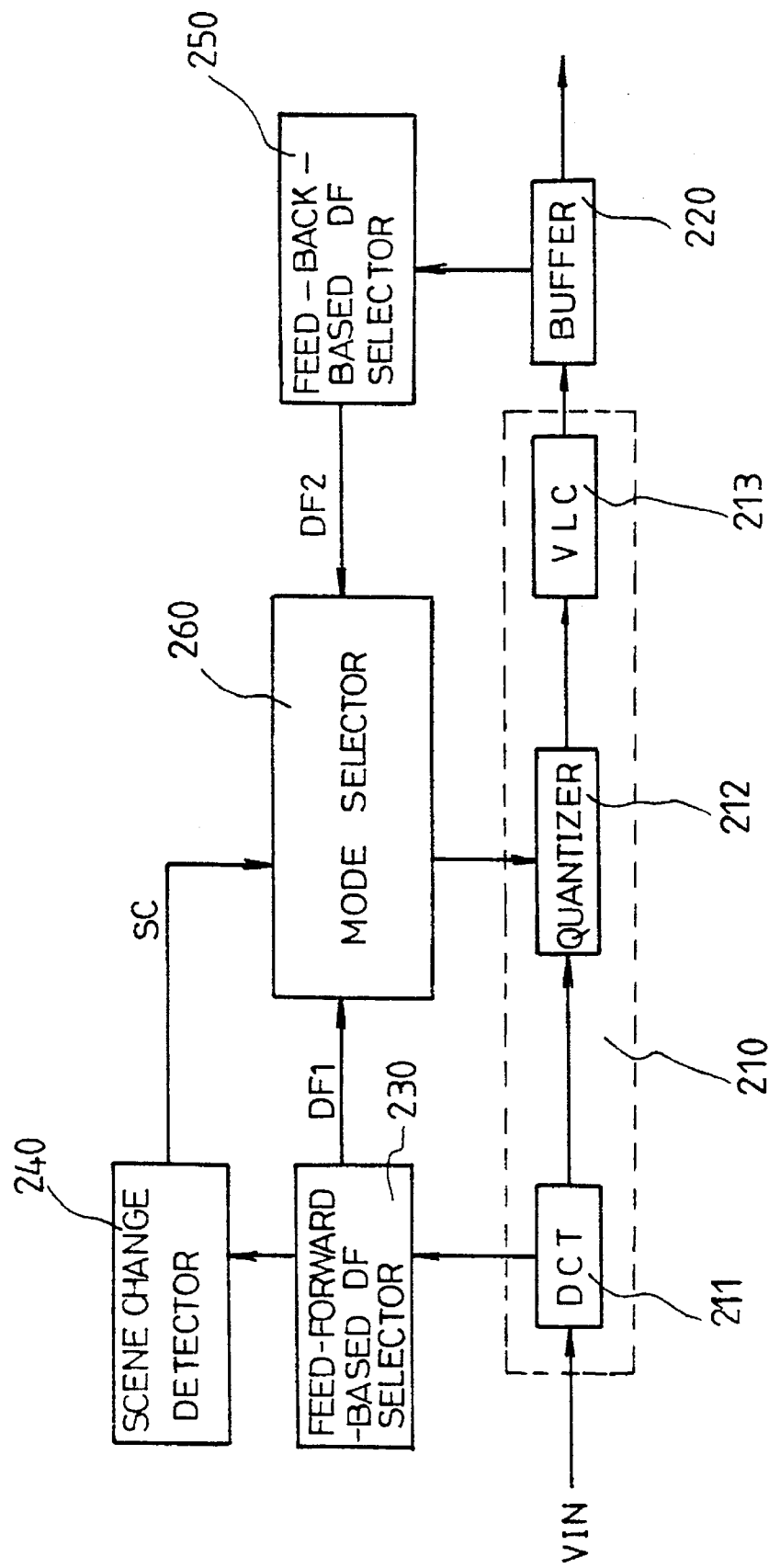
FIG. 7 is a block diagram of a buffer control apparatus in accordance with another embodiment of the present invention wherein the statistical feed-forward-based buffer control apparatus of the present invention is combined with a general feed-back-based buffer control apparatus.

Referring to FIG. 7, there is illustrated a buffer control apparatus for compression of motion-involving video intraframes in accordance with another embodiment of the present invention wherein a statistical feed-forward-based buffer control apparatus is combined with a general feed-back-based buffer control apparatus. As shown in FIG. 7, the buffer control apparatus includes an encoder 210 for variable length encoding input video data, a buffer 220 for receiving information output from the encoder 210 and externally outputting it, and a feed-forward-based DF selector 230 for receiving the information output from the encoder 210, calculating the complexity of each frame based on the received information, and estimating the quantity of data of luminance and chrominance signals thereof on the basis of the calculation. The buffer control apparatus further includes a feed-back-based DF selector 250 for generating a DF value corresponding to a state of the buffer 220 and sending the DF value to a mode selector 260, and a scene change detector 240 for receiving estimated values of bit rates of two successive frames from the feed-forward-based DF selector 230, detecting a scene change when the bit rate difference between two successive frames exceeds a predetermined threshold value, and generating a scene change detect signal SC on the basis of the detection. The buffer control apparatus also includes the mode selector 260 as its constituting element. The mode selector 260 is adapted to transmit a DF signal DF1 from the feed-forward-based DF selector 230 to a quantizer 212 upon receiving the scene change detect signal SC from the scene change detector 240, and to transmit a DF signal DF2 from the feed-back-based DF selector 250 to the quantizer 212 in the absence of the scene change detect signal SC.

The encoder 210 includes a DCT circuit 211 for converting spatial information of input video data into frequency information, the quantizer 212 for quantizing the output signal of the DCT circuit 211 to approximate a finite number of values, a VLC circuit 213 for receiving the quantized signal output from the quantizer 212 and converting position information and magnitude information of the quantized signal into a variable length code without any loss of data.

The operation of the illustrated embodiments of the present invention will now be described.

Generally, estimation of the quantity of data being generated is most important for the control of buffer. For a feed-back-based buffer, the quantity of data to be currently compressed is estimated on the basis of the quantity of data generated with regard to a previously compressed video unit (frame, block field, etc.). On the other hand, for a feed-forward-based buffer, the quantity of data generated is estimated on the basis of the complexity of the video unit to be currently compressed. The quantity of data generated in the encoder is approximately proportional to the complexity of the subject video unit. In the latter case, accordingly, the quantity of data generated can be estimated by statistically deriving the relation between the quantity of data and the complexity of the subject video unit.

First, the operation of the feed-forward-based buffer control apparatus in accordance with the embodiment of the present invention illustrated in FIG. 5 will be described.

The DCT circuit 111 converts spatial information of input video signal Vin into frequency information to be outputted. The output signal from the DCT circuit 111 is sent to the quantizer 112 which, in turn, quantizes the received DCT signal to approximate a finite number of values. The quantized signal from the quantizer 112 is then applied to the VLC circuit 113 which, in turn, converts position information and magnitude information of the received signal into a variable length code.

At this time, the feed-forward-based DF selector 120 calculates the complexity of each frame based on the output signal from the DCT circuit 111, and estimates the quantity of data of the frame based on the calculated complexity. The calculation of complexity and the estimation of data quantity are carried out by units of DCT blocks, 8×8 DCT blocks, for example.

The frame complexity may be calculated using various methods. In accordance with the present invention, the frame complexity is calculated using a sum of square root absolute value difference (SSAD) calculation which can be simply calculated as expressed in the following equation (2):

$$\sum_{i=0}^{7}\sum_{j=1}^{7}\sqrt{|f(i,j)-f(i,j-1)|} + \sum_{i=0}^{7}\sum_{j=1}^{7}\sqrt{|f(i-1,j)-f(i,j)|} \quad (2)$$

where, f(i,j) represents a pixel value at the i-th column and the j-th row in a 8×8 block unit.

Figure 6:
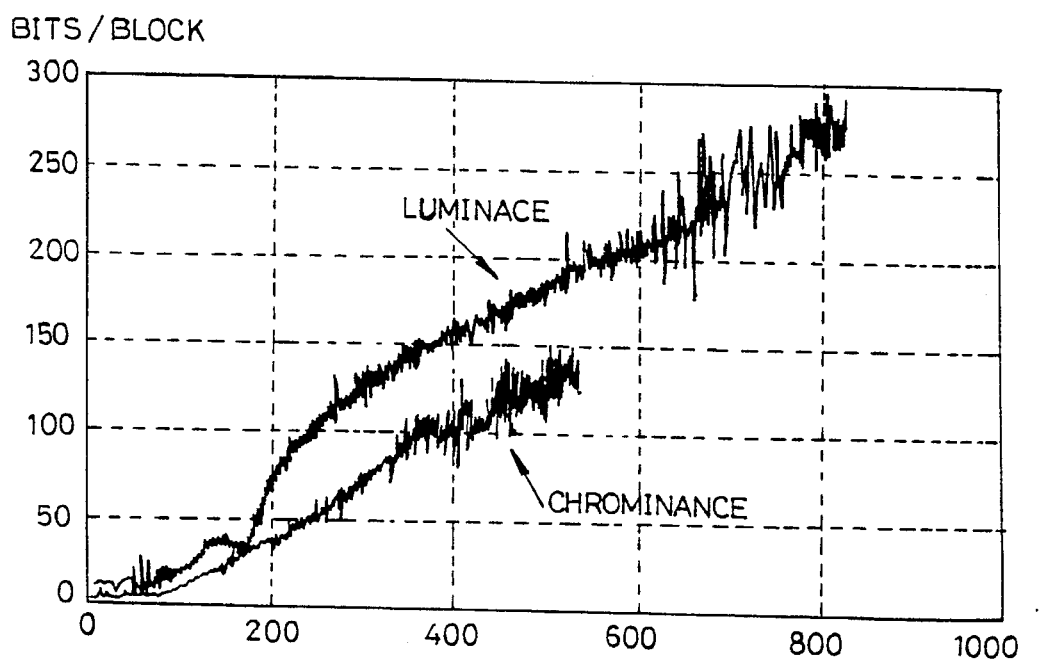
FIG. 6 is a graph illustrating a relation between the sum of squared absolute difference and the quantity of bits generated per block.

FIG. 6 is a graph illustrating a relation between the SSAD and the quantity of bits generated per 8×8 block unit of six different test pictures. Using the graph of FIG. 6, the mean number of bits generated per block unit is derived for each SSAD. In this case, the DF value is fixed to be 2.0. A JPEG base line algorithm is used as a compression algorithm.

In this case, statistics of the luminance signal and the chrominance signal are derived individually because the number of bits generated respectively from the luminance signal and the chrominance signal for the same DF value are considerably different from each other.

The number of bits generated from one frame can be estimated by calculating the SSAD of each 8×8 block unit by use of equation (2) and then by finding the number of bits corresponding to the calculated SSAD by use of the graph shown in FIG. 6, for example.

Figure 1:
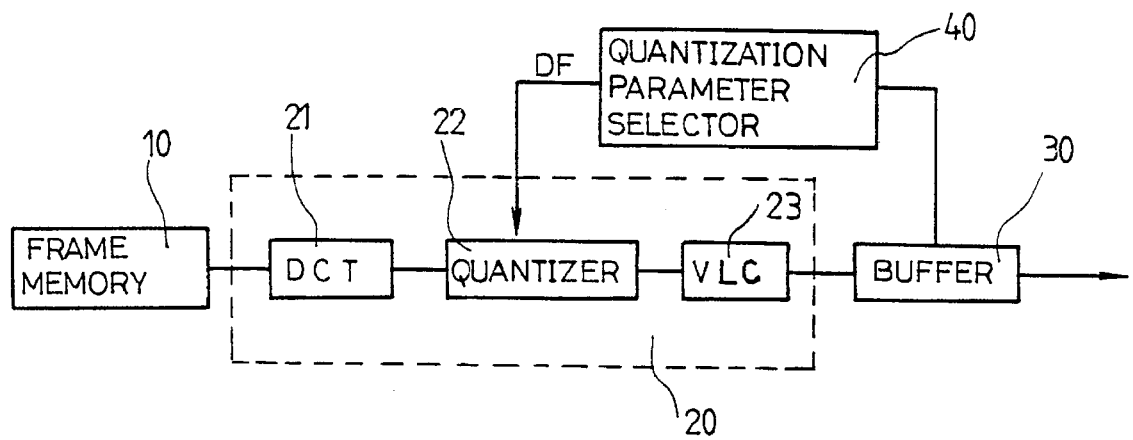
FIG. 1 is a block diagram of a general feed-back-based buffer control apparatus for compression of motion-involving video intraframes.
Figure 2:
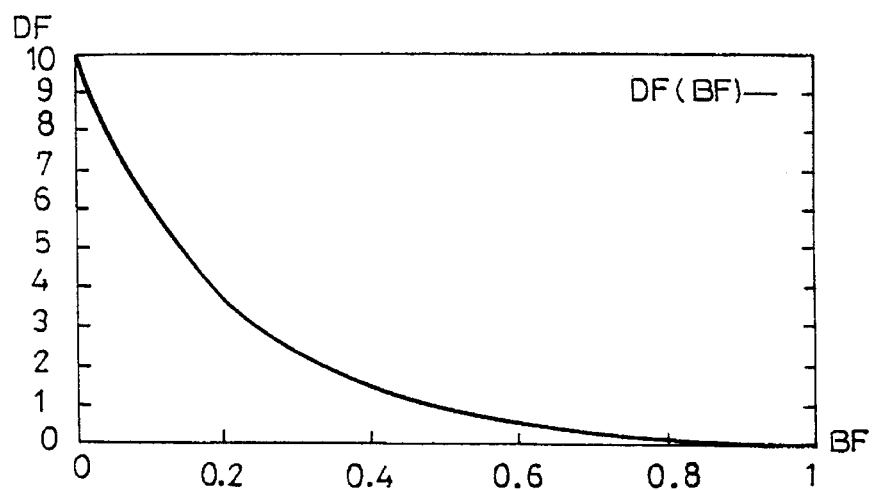
FIG. 2 is a graph illustrating the relation between buffer fullness and DF values.
Figure 3:
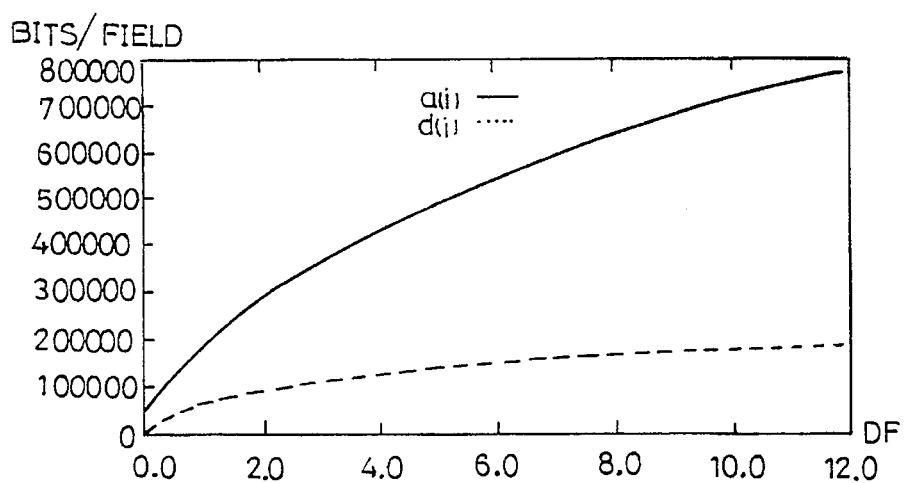
FIG. 3 is a graph illustrating the relation between DF and the quantity of bits generated per field.
Figure 4:
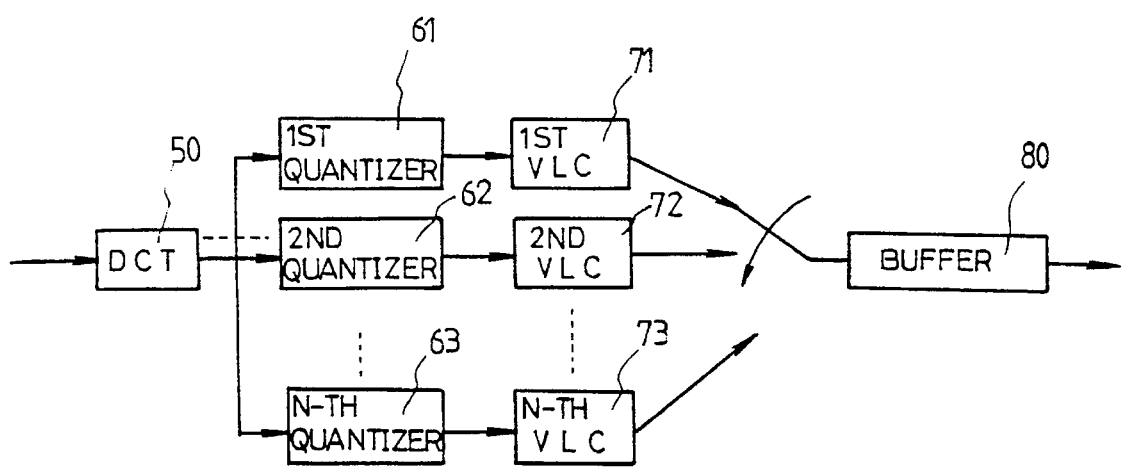
FIG. 4 is a block diagram illustrating a conventional feed-forward-based buffer control apparatus wherein a general feed-forward-based buffer control technique is applied to a JPEG data compression algorithm.

Thereafter, the number of bits to be generated from one frame is estimated by summing the quantities of bits estimated for the luminance and chrominance signals of all blocks in 8×8 block units of the frame at the DF value of 2.0. The estimated number of bits at the DF value of 2.0 is derived using the DF-bit curve of FIG. 3 and the above-mentioned equation (1).

In other words, the estimated number of bits can be derived by substituting m of $n_K(m)$ in equation (1) with 2.0 indicative of DF value. Using the statistical relation depicted on the DF-bit curve, the number of bits at each of the optional DF values ranging between 0 and 12 is estimated. Finally, a DF value to be used in the quantizer is determined as the DF value corresponding to the estimated number of bits most approximate to the number of bits outputted from the buffer.

Now, operation of the buffer control apparatus in accordance with the embodiment of the present invention illustrated in FIG. 7 will be described. As mentioned above, in accordance with this embodiment, the feed-forward-based control apparatus illustrated in FIG. 5 is combined with the general feed-back-based control apparatus so as to selectively use either the feed-forward-based buffer control or the feed-back-based buffer control on the basis of the detection of a scene change.

The DCT circuit 211 converts spatial information of input video signal Vin into frequency information to be outputted. The output signal from the DCT circuit 211 is sent to the quantizer 212 which, in turn, quantizes the received DCT signal to approximate a finite number of values. The quantized signal from the quantizer 212 is then applied to the VLC circuit 213 which, in turn, converts position information and magnitude information of the received signal into a variable length code without any loss of data. The variable length code is then applied to the buffer 220.

On the other hand, the feed-forward-based DF selector 230 receives the information from the DCT circuit 211, calculates the complexity of each frame based on the received information, and estimates the quantity of data for luminance and chrominance signals based on the calculated complexity. The scene change detector 240 receives the estimated values of bit rates of two successive flames from the feed-forward-based DF selector 230. When the bit rate difference between the successive two frames exceeds a predetermined threshold value, the scene change detector 240 detects a scene change. In this case, a scene change detect signal SC is applied from the scene change detector 240 to the mode selector 260.

Upon receiving the scene change detect signal SC from the scene change detector 240, the mode selector 260 transmits a DF value DF1 from the feed-forward-based DF selector 230 to the quantizer 212 so as to control the quantity of data generated in accordance with the feed-forward-based control. When the mode selector 260 does not receive the scene change detect signal SC from the scene change detector 240, it determines that no scene change has occurred. In this case, the mode selector 260 transmits a DF value DF2 from the feed-back-based DF selector 250 to the quantizer 212 so as to control the quantity of data generated in accordance with the feed-back-based control.

As apparent from the above description, the present invention provides a buffer control apparatus for the compression of motion-involving video intraframes in accordance with another embodiment of the present invention wherein a statistical feed-forward-based buffer control apparatus having a simple construction is combined with an existing statistical feed-back-based buffer control apparatus, thereby advantageously being capable of stably controlling a buffer even when a scene change occurs, and thereby advantageously reducing the capacity of the buffer and the length of a tape needed. Where only the feed-forward-based control in accordance with the present invention is used, it can be simply realized, as compared with the existing feed-back-based control methods.

Although the preferred embodiments of the invention have been disclosed for illustrative purposes, those skilled in the art will appreciate that various modifications and additions are possible, without departing from the scope and spirit of the invention as recited in the accompanying claims.

What is claimed is:

1. A buffer control apparatus for compression of motion-involving video intraframes, comprising:

encoder means for encoding input video frame data to be compressed;

feed-forward-based division factor selector means for calculating a complexity of each frame based upon an output signal from the encoder means, estimating a quantity of data to be generated in units of a predetermined number of discrete cosine transform blocks by using a relation between the calculated complexity and a predetermined quantity of bits generated in test pictures, and sending a division factor corresponding to the estimated quantity of data to the encoder means;

buffer means for storing an output signal from the encoder means;

division factor generation means for generating a division factor based on an output from the buffer means;

detection means connected to the feed-forward-based division factor selector means, for detecting a scene change based on a bit rate difference between two successive video frames received from the feed-forward-based division factor selector means, and generating a scene change detection signal based on the detection; and selection means for receiving the scene change detection signal generated from the detection means and selecting between the division factor from the feed-forward-based division factor selector means and the division factor from the division factor generation means, based on the scene change detection signal.

2. A buffer control apparatus in accordance with claim 1, wherein the feed-forward-based division factor selector means calculates the complexity of each frame in units of 8×8 discrete cosine transform blocks to estimate the quantity of data to be generated.

3. A buffer control apparatus in accordance with claim 1, wherein the feed-forward-based division factor selector means calculates the complexity of each frame by using a sum of square root absolute value difference calculation.

4. A buffer control apparatus in accordance with claim 1, wherein the feed-forward-based division factor selector means derives estimated statistics of quantities of data individually for input luminance and chrominance signals.

5. A buffer control apparatus in accordance with claim 1, wherein said selection means selects the division factor from the feed-forward-based division factor selector means when the scene change detection signal is received thereby, and said selection means selects the division factor from the division factor generation means in the absence of the scene change detection signal.

6. A buffer control apparatus in accordance with claim 1, wherein said encoder means includes:
a discrete cosine transform circuit for carrying out a discrete cosine transform operation upon the input video frame data,
a quantizer for quantizing data output from the discrete cosine transform circuit, and
a variable length coding circuit for variable length encoding the quantized data output from the quantizer.

7. A buffer control apparatus in accordance with claim 1, wherein said feed-forward-based division factor selector means calculates the complexity of each frame by calculating differences between pixel values for each of the discrete cosine transform blocks, determining square root of absolute value of the differences, and summing the determined square roots.

8. A buffer control apparatus for compression of motion-involving video intraframes, comprising:
encoder means for encoding input video frame data including luminance and chrominance signals to be compressed;
buffer means for storing an output signal from the encoder means;
feed-back-based division factor selector means for generating a division factor corresponding to a state of the buffer means;
feed-forward-based division factor selector means for receiving output information from the encoder means, calculating a complexity of each frame based on the received information, and estimating a quantity of output data of the luminance and chrominance signals on the basis of the calculated complexity;
scene change detector means for receiving estimated values of bits rates of two successive video frames from the feed-forward-based division factor selector means, detecting a scene change when a bit rate difference between two successive video frames exceeds a predetermined threshold value, and generating a scene change detect signal on the basis of the detection; and
mode selector means for transmitting a division factor from the feed-forward-based division factor selector means to the encoder means upon receiving the scene change detect signal from the scene change detector means and for transmitting the division factor from the feed-back-based division factor selector means to the encoder means in the absence of the scene change detect signal.

9. A buffer control apparatus in accordance with claim 8, wherein the feed-forward-based division factor selector means calculates the complexity of each frame using a sum of square root absolute value difference calculation.

10. A buffer control apparatus in accordance with claim 8, wherein the feed-forward-based division factor selector means calculates the complexity of each frame in units of 8×8 discrete cosine transform blocks.

11. A method of compressing motion-involving video intraframes, comprising the steps of:
encoding input video frame data;
estimating a quantity of data to be generated based on an output signal generated at said encoding step and outputting a first division factor based on said estimation;
detecting a scene change based on said estimation;
generating a scene change detection signal when the scene change is detected;
buffering the encoded video frame data;
generating a second division factor based on an output signal generated at said buffering step; and
selecting between the first division factor and the second division factor based on the generation of the scene change detection signal.

12. A method in accordance with claim 11, wherein said estimating step includes calculating a complexity of each frame using a sum of square root absolute value difference calculation.

13. A method in accordance with claim 11, wherein said scene change detection signal generating step includes determining a bit rate difference between two successive video frames and comparing the bit rate difference with a predetermined threshold value to generate the scene change detection signal.

* * * * *